United States Patent
Furuyama et al.

(10) Patent No.: US 9,708,453 B2
(45) Date of Patent: Jul. 18, 2017

(54) METHOD FOR PRODUCING POROUS POLYMER FILM AND POROUS POLYMER FILM

(71) Applicant: NITTO DENKO CORPORATION, Ibaraki-shi, Osaka (JP)

(72) Inventors: Satoru Furuyama, Osaka (JP); Yozo Nagai, Osaka (JP); Junichi Moriyama, Osaka (JP); Yosuke Yuri, Gunma (JP); Takahiro Yuyama, Gunma (JP); Tomohisa Ishizaka, Gunma (JP); Ikuo Ishibori, Gunma (JP); Ken-ichi Yoshida, Gunma (JP); Yasunari Maekawa, Gunma (JP); Hiroshi Koshikawa, Gunma (JP); Tetsuya Yamaki, Gunma (JP); Masaharu Asano, Gunma (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/778,498

(22) PCT Filed: Mar. 26, 2014

(86) PCT No.: PCT/JP2014/001757
§ 371 (c)(1),
(2) Date: Sep. 18, 2015

(87) PCT Pub. No.: WO2014/156155
PCT Pub. Date: Oct. 2, 2014

(65) Prior Publication Data
US 2016/0289402 A1    Oct. 6, 2016

(30) Foreign Application Priority Data

Mar. 27, 2013 (JP) .................. 2013-066946

(51) Int. Cl.
*C08J 5/18* (2006.01)
*B31D 3/00* (2017.01)
(Continued)

(52) U.S. Cl.
CPC ................. *C08J 5/18* (2013.01); *C08J 7/123* (2013.01); *C08J 2300/00* (2013.01)

(58) Field of Classification Search
None
See application file for complete search history.

(56) References Cited

U.S. PATENT DOCUMENTS

| 4,802,951 | A | * | 2/1989 | Clark | ...................... G03F 7/039 216/39 |
| 4,832,997 | A | | 5/1989 | Balanzat et al. | |

(Continued)

FOREIGN PATENT DOCUMENTS

| EP | 2832529 | 2/2015 |
| GB | 1 259 303 | 1/1972 |

(Continued)

OTHER PUBLICATIONS

Extended European Search Report for European Application No. 14775623.3, dated Oct. 7, 2016, 6 pages.

(Continued)

*Primary Examiner* — Shamim Ahmed
(74) *Attorney, Agent, or Firm* — Hamre, Schumann, Mueller & Larson, P.C.

(57) ABSTRACT

The method of the present disclosure is a method for producing a porous polymer film including: irradiating a strip-shaped polymer film with an ion beam while moving the polymer film transversely to the ion beam, so as to form a polymer film that has collided with ions in the beam; and chemically etching the formed polymer film so as to form openings and/or through holes corresponding to tracks left (Continued)

by the colliding ions in the polymer film. The ion beam (11) with which the polymer film is irradiated is obtained by folding a tail of an original beam (51) inwardly toward a center of the original beam by nonlinear focusing. The original beam is composed of ions accelerated in a cyclotron and has a cross-sectional intensity distribution profile in which an intensity is maximum at the center of the original beam and continuously decreases from the center toward the tail of the original beam, and the profile is an intensity distribution profile in a cross section perpendicular to a direction of the original beam.

5 Claims, 7 Drawing Sheets

(51) Int. Cl.
  *B23K 26/04* (2014.01)
  *B44C 1/22* (2006.01)
  *C08J 7/12* (2006.01)

(56) References Cited

U.S. PATENT DOCUMENTS

| | | | |
|---|---|---|---|
| 4,956,219 A | 9/1990 | Legras et al. | |
| 6,150,280 A * | 11/2000 | Yamashita | H01J 37/09 216/12 |
| 7,960,708 B2 * | 6/2011 | Wolfe | B01D 67/0034 216/56 |
| 9,005,334 B2 | 4/2015 | Furuyama et al. | |
| 2005/0092922 A1 * | 5/2005 | Muto | H01J 37/3005 250/309 |

FOREIGN PATENT DOCUMENTS

| | | |
|---|---|---|
| JP | 52-003987 B | 1/1977 |
| JP | 54-011971 | 1/1979 |
| JP | 59-117546 | 7/1984 |
| JP | 63-154750 | 6/1988 |
| JP | 2001-210265 | 8/2001 |
| JP | 2012-229309 | 11/2012 |
| WO | 8705850 | 10/1987 |
| WO | 2011/158408 | 12/2011 |

OTHER PUBLICATIONS

Yuri, et al., "Uniformization of the transverse beam profile by means of nonlinear focusing method", Physical Review Special Topics—Accelerators and Beams, vol. 10, pp. 104001-1-14001-11, 2007.

* cited by examiner

METHOD FOR PRODUCING POROUS POLYMER FILM AND POROUS POLYMER FILM

TECHNICAL FIELD

The present invention relates to a method for producing a porous polymer film using ion beam irradiation and to a porous polymer film.

BACKGROUND ART

Methods for producing porous polymer films by ion beam irradiation and subsequent chemical etching are known (see, for example, Patent Literatures 1 to 3). When a polymer film is irradiated with an ion beam, damage of the polymer chains in the polymer film occurs due to collision with the ions in regions of the polymer film through which the ions have passed. The damaged polymer chains are more susceptible to chemical etching than other regions of the film. Therefore, by chemically etching the ion-beam-irradiated polymer film, pores corresponding to the tracks of the colliding ions are formed in the polymer film, and thus a porous polymer film having the pores is obtained.

Non-Patent Literature 1 discloses uniformization of an ion beam profile by means of a nonlinear focusing method.

CITATION LIST

Patent Literature

Patent Literature 1: JP 52(1977)-003987 B
Patent Literature 2: JP 54(1979)-011971 A
Patent Literature 3: JP 59(1984)-117546 A

Non-Patent Literature

Yosuke Yuri, et al., "Uniformization of the transverse beam profile by means of nonlinear focusing method", Physical Review Special Topics—Accelerators and Beams, vol. 10, 104001 (2007)

SUMMARY OF INVENTION

Technical Problem

In the conventional methods for producing porous polymer films using ion beam irradiation and subsequent chemical etching, due consideration is not given to industrial production of these films. It is an object of the present invention to provide a method for producing a porous polymer film that is suitable for industrial production.

Solution to Problem

The production method of the present disclosure includes: (I) irradiating a polymer film with an ion beam so as to form a polymer film that has collided with the ions in the beam; and (II) chemically etching the formed polymer film so as to form openings and/or through holes corresponding to tracks left by the colliding ions in the polymer film. Here, the ion beam with which the polymer film is irradiated is obtained by folding a tail of an original beam inwardly toward a center of the original beam by nonlinear focusing. The original beam is composed of ions accelerated in a cyclotron and has a cross-sectional intensity distribution profile in which an intensity is maximum at the center of the original beam and continuously decreases from the center toward the tail of the original beam. The profile is an intensity distribution profile in a cross section perpendicular to a direction of the original beam. In the irradiation (I), the polymer film having a strip shape is moved transversely to the ion beam so as to irradiate the polymer film with the ion beam.

The porous polymer film of the present disclosure is a porous polymer film obtained by the production method of the present disclosure.

Advantageous Effects of Invention

The production method of the present disclosure is suitable for industrial production of porous polymer films.

DESCRIPTION OF EMBODIMENTS

Figure 1:
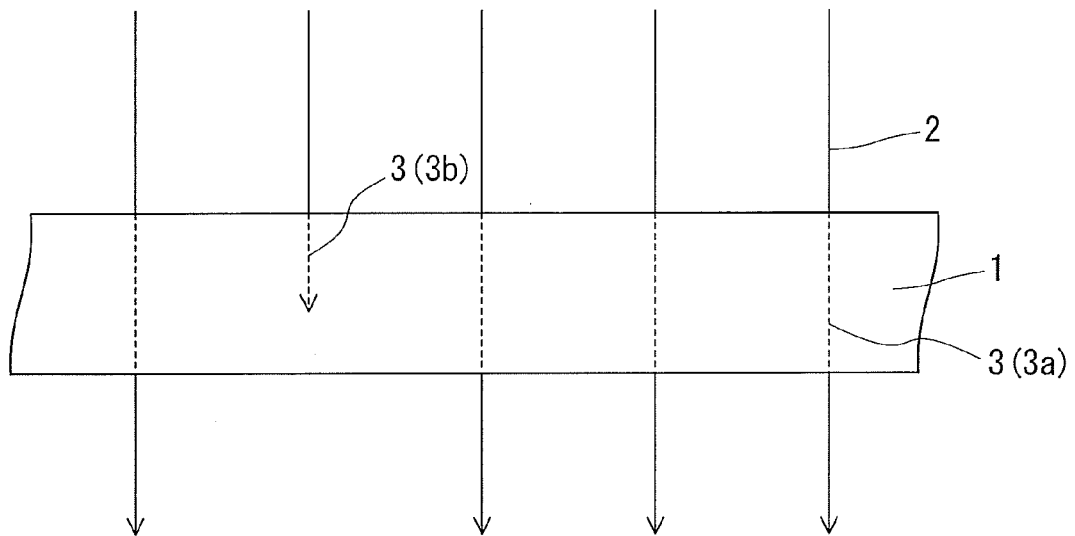
FIG. 1 is a schematic diagram for explaining the outline of the irradiation step (I) in the production method of the present disclosure.

A first aspect of the present disclosure provides a method for producing a porous polymer film, including: (I) irradiating a polymer film with an ion beam so as to form a polymer film that has collided with ions in the beam; and (II) chemically etching the formed polymer film so as to form openings and/or through holes corresponding to tracks left by the colliding ions in the polymer film, wherein the ion beam with which the polymer film is irradiated is obtained by folding a tail of an original beam inwardly toward a center of the original beam by nonlinear focusing, the original beam being composed of ions accelerated in a cyclotron and having a cross-sectional intensity distribution profile in which an intensity is maximum at the center of the original beam and continuously decreases from the center toward the tail of the original beam, and the profile being an intensity distribution profile in a cross section perpendicular to a direction of the original beam, and in the irradiation (I), the polymer film having a strip shape is moved transversely to the ion beam so as to irradiate the polymer film with the ion beam.

A second aspect of the present disclosure provides the method for producing a porous polymer film according to the first aspect, wherein the original beam has the profile of a normal intensity distribution in which the intensity is maximum at the center of the original beam.

A third aspect of the present disclosure provides the method for producing a porous polymer film according to the first or second aspect, wherein the original beam has the cross section of an approximately circular or elliptical shape.

A fourth aspect of the present disclosure provides the method for producing a porous polymer film according to any one of the first to third aspects, wherein the ion beam is obtained by folding the tail of the original beam inwardly toward the center of the original beam in two directions perpendicular to each other in the cross section of the original beam by nonlinear focusing.

A fifth aspect of the present disclosure provides the method for producing a porous polymer film according to any one of the first to fourth aspects, wherein the ion beam has a cross section of an approximately rectangular shape.

A sixth aspect of the present disclosure provides the method for producing a porous polymer film according to the fifth aspect, wherein in the irradiation (I), the polymer film is irradiated with the ion beam in such a manner that a direction of a long side of the approximately rectangular shape coincides with a width direction of the strip-shaped polymer film passing transversely across the ion beam.

A seventh aspect of the present disclosure provides the method for producing a porous polymer film according to any one of the first to sixth aspects, wherein in the irradiation (I), the polymer film is irradiated with the ion beam being applied in a fixed direction.

An eighth aspect of the present disclosure provides the method for producing a porous polymer film according to any one of the first to seventh aspects, wherein the ions have a larger mass number than neon.

A ninth aspect of the present disclosure provides a porous polymer film obtained by the method for producing a porous polymer film according to any one of the first to eighth aspects.

In the production method of the present disclosure, a polymer film is irradiated with an ion beam so as to form a polymer film that has collided with the ions in the beam (Irradiation Step (I)). The ion beam is composed of accelerated ions. When a polymer film 1 is irradiated with an ion beam, ions 2 in the beam collide with the polymer film 1 and the colliding ions 2 leave tracks 3 in the film 1, as shown in FIG. 1. When the ions 2 pass through the polymer film 1, the tracks 3 passing through the film 1 (tracks 3a) are formed, whereas when the ions 2 do not pass through the polymer film 1, the tracks 3 terminated in the film 1 (tracks 3b) are formed. Whether the ions 2 pass through the polymer film 1 or not depends on the type of the ions 2 (ionic species), the energy of the ions 2, the thickness of the polymer film 1, the type of the polymer (polymeric species) constituting the polymer film 1, etc.

Figure 2:
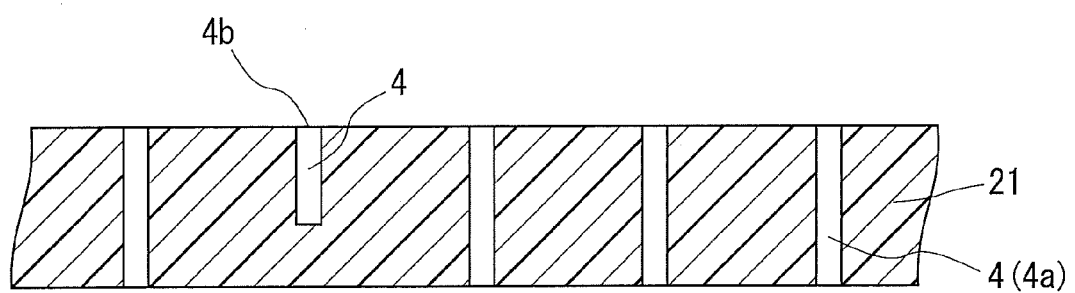
FIG. 2 is a schematic diagram for explaining the outline of the etching step (II) in the production method of the present disclosure.

In the production method of the present disclosure, after the irradiation step (I), the polymer film 1 that has collided with the ions 2 is chemically etched so as to form pores corresponding to the tracks 3 left by the colliding ions 2 in the polymer film 1 and thereby obtain a porous polymer film (Etching Step (II)). In the tracks 3 of the ions 2 in the polymer film 1, the polymer chains constituting the film 1 are damaged by the collision with the ions. The damaged polymer chains are more likely to be degraded and removed by chemical etching than polymer chains that have not collided with the ions 2. Therefore, the regions of the tracks 3 in the polymer film 1 are selectively removed by chemical etching, and a porous polymer film 21 having pores 4 corresponding to the tracks 3 formed therein, as shown in FIG. 2, is obtained. The pores corresponding to the tracks 3a passing through the polymer film 1 form through holes 4a. The pores 4 corresponding to the tracks 3b terminated in the polymer film 1 form recesses having openings 4b on one surface (ion-irradiated surface) of the porous polymer film 21. In the porous polymer film 21, the openings 4b and/or the through holes 4a corresponding to the tracks 3 are formed. In this description, the "porous" refers to the presence of a plurality of openings and/or through holes thus formed. The regions of the porous polymer film 21 other than the openings 4b and the through holes 4a are essentially the same as the original polymer film 1 used in the irradiation step (I) unless an additional step of changing the state of the film is performed. These regions can be non-porous, for example.

On the size scale of the polymer film 1 as an object to be irradiated, the ions 2 colliding with the polymer film 1 usually travel almost linearly, and leave linear tracks 3 in the film 1. Therefore, the recesses having the openings 4b and the through holes 4a usually have a linearly extending shape. In this case, however, the center line of each of the recesses and the through holes 4a extends linearly, but the shape of the inner wall thereof varies with the type of the ions 2 applied to the polymer film 1 and the type of the polymer constituting the polymer film 1. This is because the interaction between the ions and the polymer varies with their species. For example, the through holes or the recesses formed in the polymer film 1 may have a straight tubular shape with an almost constant diameter in their extending direction (the thickness direction of the polymer film 1), or a so-called hourglass shape with a diameter once decreasing and increasing again in their extending direction.

[Irradiation Step (I)]

The step (I) is an irradiation step in which a polymer film is irradiated with an ion beam so as to form a polymer film that has collided with the ions in the beam.

When the polymer film is placed in the path of the ion beam, the ions in the beam usually collide with the polymer film. However, mere placement of the polymer film is not necessarily a method suitable for industrial production of porous polymer films. For example, porous polymer films cannot be efficiently produced by a method in which after a piece of polymer film obtained by cutting a polymer film into a size of a desired porous polymer film is placed in the path of an ion beam and irradiated with the ion beam so as to collide with the ion beam, the polymer film that has collided with the ions is removed from the path and subjected to chemical etching, and then another piece of polymer film is placed in the path of the ion beam and irradiated with the ion beam.

In the irradiation step (I) of the production method of the present disclosure, the strip-shaped polymer film 1 is moved transversely to the ion beam so as to irradiate the polymer film 1 with the ion beam. In this method, the polymer film 1 is irradiated with the ion beam when the polymer film 1 passes transversely across the ion beam, and thus the ions 2 in the beam collide with the film 1. Thereby, efficient production of the porous polymer film 21 is expected. Furthermore, continuous formation of the polymer film 1 that has collided with the ions 2 and consequently continuous production of the porous polymer film 21 are expected depending on how the polymer film 1 is moved.

In addition, in the irradiation step (I), the polymer film 1 is irradiated with the ion beam composed of the ions 2 accelerated in a cyclotron. The cyclotron is, for example, an AVF cyclotron. In the case where a cyclotron is used to accelerate ions generated in an ion source, the polymer film 1 can be continuously irradiated with highly-accelerated, high-density ions. Also in view of this, efficient production of the porous polymer film 21 is expected.

Figure 3A:
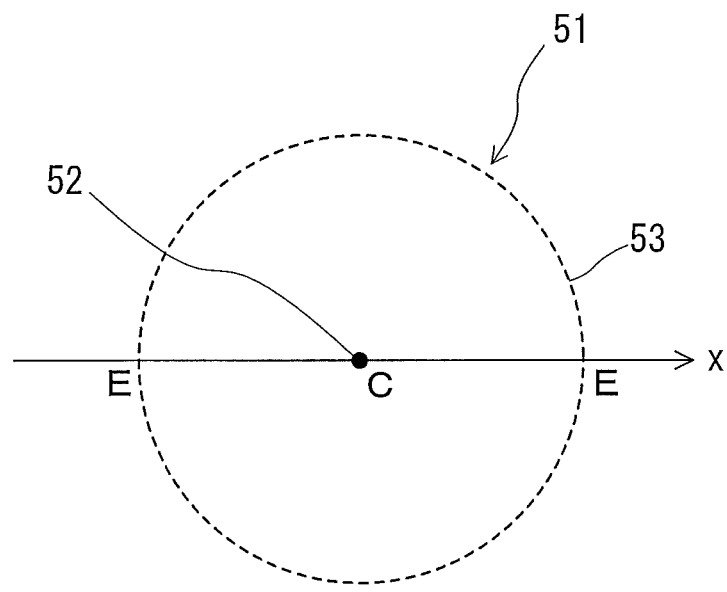
FIG. 3A is a schematic diagram for explaining a cross section of an example of a beam (an original beam) composed of ions accelerated in a cyclotron, when the cross section is taken perpendicular to the direction of the beam.
Figure 3B:
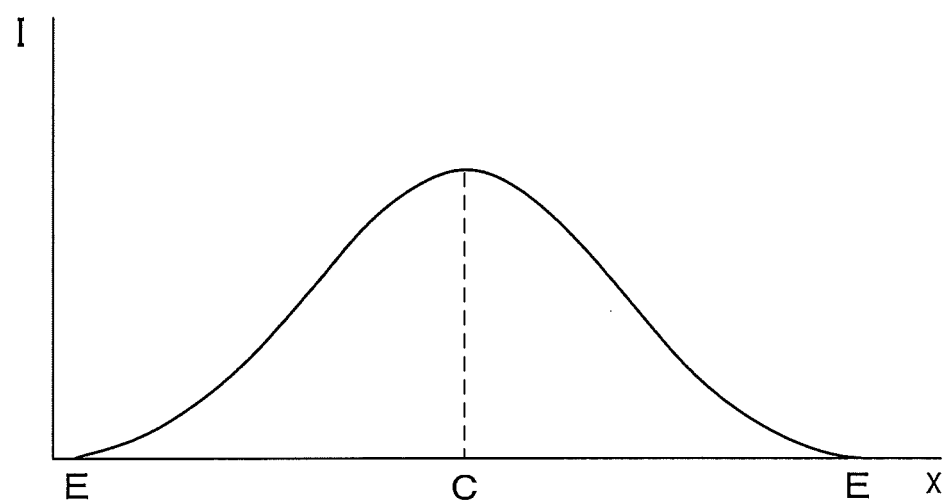
FIG. 3B is a schematic diagram showing an intensity distribution (intensity distribution of the ion beam) in the x-axis direction in the cross section shown in FIG. 3A.

The intensity distribution of an ion beam composed of ions accelerated in a cyclotron (which can also be considered as the probability distribution of the presence of the ion particles in the beam) is not necessarily uniform across the beam. The ion beam usually has a cross-sectional intensity distribution profile (cross-sectional beam profile) in which the intensity is maximum at the center of the beam and continuously decreases from the center toward the tail of the beam, when the cross section of the beam is taken perpendicular to the direction of the beam (hereinafter, this cross section is simply referred to as the "cross section") (see, FIG. 3A and FIG. 3B). FIG. 3A shows the cross section of an example of such an ion beam 51, and the intensity distribution of the ion beam in this cross section is as shown in FIG. 3B, as indicated on the x axis (Point E-Point C-Point E) passing through the beam center 52 on the cross section. In FIG. 3B, the vertical axis indicates the normalized intensity I of the ion beam, which shows that the ion beam 51 has the maximum intensity at the beam center 52 (Point C). Point E at which the intensity is almost zero in FIG. 3B corresponds to the periphery 53 of the ion beam 51 indicated by a dashed line in FIG. 3A. The ion beam 51 shown in FIG. 3A and FIG. 3B is circular in cross section (has a circular periphery 53), and the beam intensity decreases continuously and isotropically from the beam center 52 toward the periphery. The term "isotropically" means that the same or similar beam intensity distribution (for example, the distribution shown in FIG. 3B) can be obtained on any axis passing through the beam center in the cross section of the ion beam. As shown in FIG. 3B, the ion beam 51 has an intensity distribution based on the normal distribution with the maximum intensity at the beam center 52. That is, the ion beam 51 has a cross-sectional intensity distribution profile of the normal distribution with the maximum intensity at the beam center. Such an ion beam can be obtained, for example, by allowing cyclotron-accelerated ions to pass through a scatterer formed of a metal thin film or the like.

Figure 4:
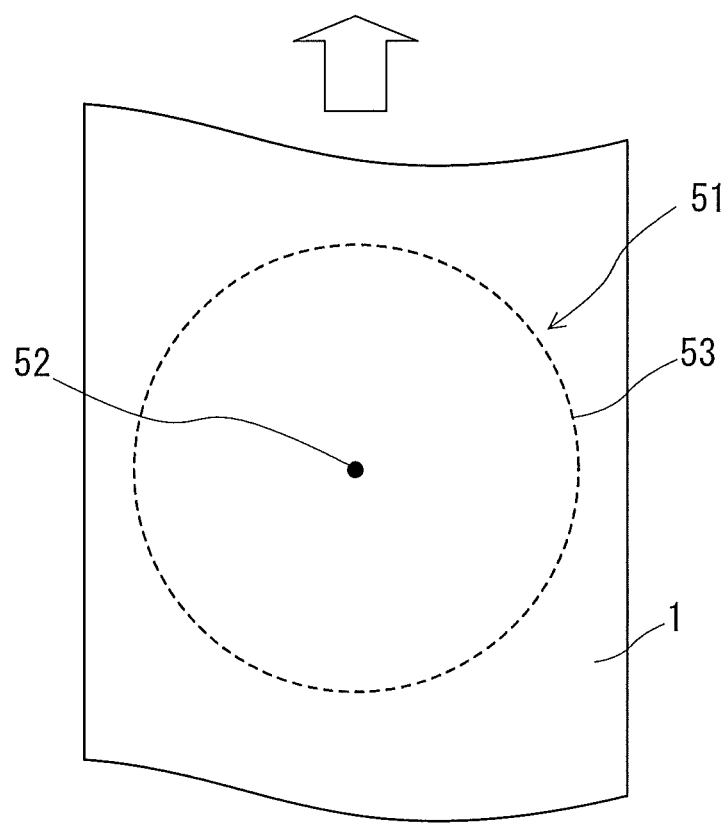
FIG. 4 is a schematic diagram showing a conventional method for irradiating a strip-shaped polymer film with an ion beam.

The ion beam 51 having the above-mentioned cross-sectional intensity distribution profile has a less uniform cross-sectional intensity distribution. A different beam intensity means a different density of the ions 2 colliding with the polymer film 1. Therefore, it is difficult to obtain a porous polymer film having high uniformity of porosity, which means that it is difficult to improve the uniformity of porosity even if the polymer film 1 is moved transversely to the ion beam 51. For example, in the example shown in FIG. 4, the strip-shaped polymer film 1 is irradiated with the ion beam 51 while being moved in its longitudinal direction. In this case, a polymer film is formed in which many of the ions collide with the central portion of the film 1 in its width direction and the collision density (irradiation density) of the ions decreases with distance from the central portion to both sides of the film 1.

Figure 5:
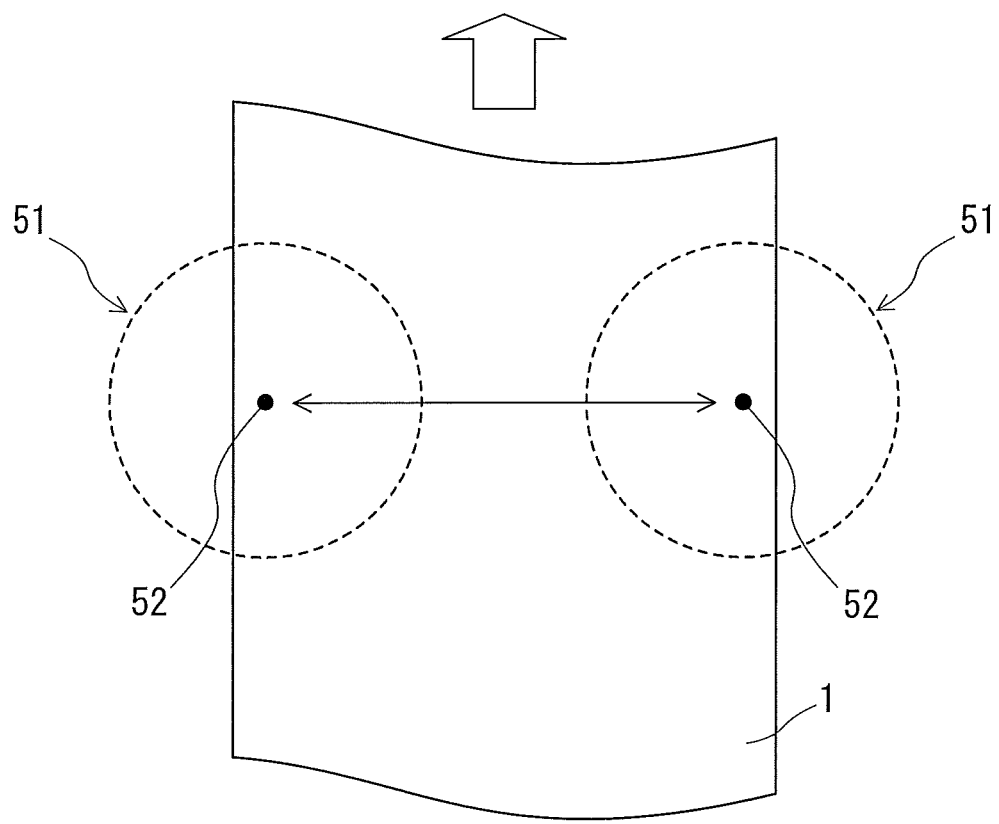
FIG. 5 is a schematic diagram showing a conventional method for irradiating a strip-shaped polymer film with an ion beam in such a manner that the film is scanned by the ion beam.

It may be possible to use a technique to try to increase the uniformity of the collision density of ions in the polymer film 1 by irradiating the film 1 with the ion beam 51 while scanning the film 1 by that ion beam 51. For example, in the example shown in FIG. 5, the polymer film 1 is scanned by the ion beam 51 in such a manner that the beam center 52 of the ion beam 51 sweeps across the polymer film 1 from the vicinity of one end of the polymer film 1 to the vicinity of the other end thereof in its width direction. However, if the polymer film 1 is moved in its longitudinal direction under such scanning, a striped film, in which a portion with which relatively many ions have collided and a portion with which a relatively few ions have collided (or a portion with which few ions have collided) are alternately arranged, is formed due to the above-described high non-uniformity of the intensity distribution of the ion beam 51, which means that it is still difficult to obtain a porous polymer film having high uniformity of porosity.

In the irradiation step (I), an ion beam obtained by modifying the profile of this ion beam 51 as an original beam by nonlinear focusing is used to irradiate the polymer film 1. Specifically, an ion beam obtained by folding the tail of the original beam inwardly toward the center of the original beam by nonlinear focusing is used to irradiate the polymer film 1. Here, the original beam is composed of ions accelerated in a cyclotron and has a cross-sectional intensity distribution profile in which the intensity is maximum at the center of the original beam and continuously decreases from the center toward the tail of the original beam, when the cross section is taken perpendicular to the direction of the original beam.

Figure 6A:
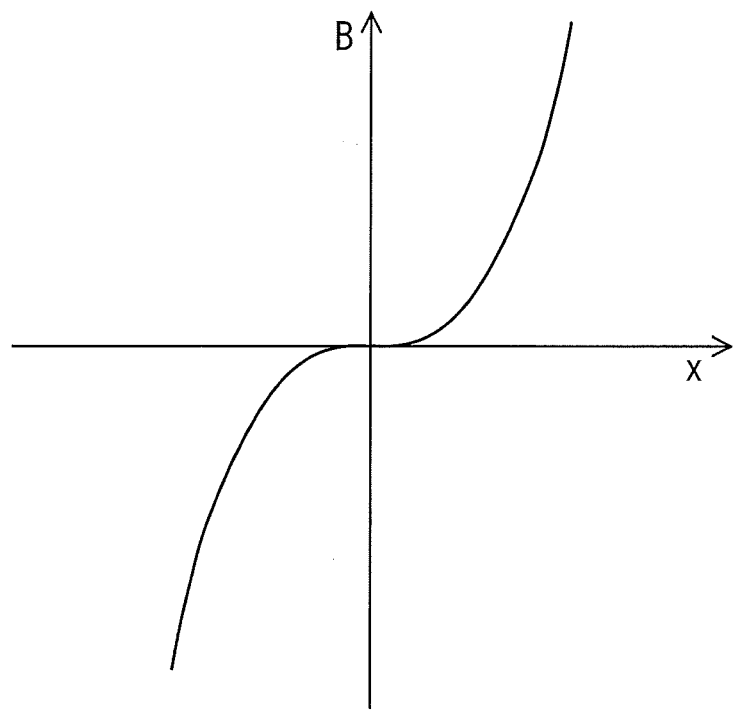
FIG. 6A is a diagram for explaining an example of a nonlinear magnetic field to be applied to the original beam to fold the tail of the original beam by nonlinear focusing.
Figure 6B:
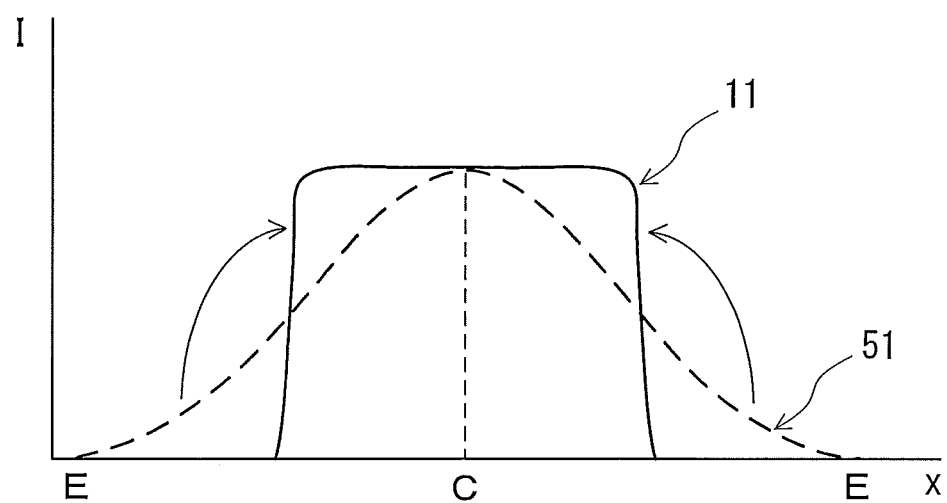
FIG. 6B is a schematic diagram showing an example of the folding of the tail of the original beam by nonlinear focusing.

FIG. 6A and FIG. 6B show an example of the folding of the tail of the original beam by nonlinear focusing. Nonlinear focusing is a technique for applying a nonlinearly controlled magnetic field to an ion beam to focus the beam. For example, when a nonlinear magnetic field B shown in FIG. 6A is applied to the ion beam 51 (see FIG. 3B) having a cross-sectional intensity distribution profile of the normal distribution with the maximum intensity at the beam center, the tail of the intensity distribution of the original beam 51 indicated by a dashed line is folded inwardly toward the beam center, as shown in FIG. 6B. Thus, the ion beam 11 having an intensity distribution indicated by a solid line can be obtained. As understood from FIG. 6B, the uniformity of the cross-sectional intensity distribution of the ion beam 11 obtained by this folding is higher than that of the original beam 51. Therefore, by irradiating the polymer film 1 with the ion beam 11, a polymer film having high uniformity of the collision density of ions can be formed, and consequently a porous polymer film having high uniformity of porosity can be produced.

Since the irradiation with this ion beam 11 has high compatibility with the transverse movement of the polymer film 1 across the ion beam, a combination of these irradiation and movement significantly improves the productivity of porous polymer films having highly uniform porosity. Furthermore, since the ion beam 11 is also composed of cyclotron-accelerated ions, like the original beam 51, it is possible to obtain the effects resulting from the fact that the polymer film 1 can be continuously irradiated with highly-accelerated ions at a high density.

The folding of the tail of the original beam by nonlinear focusing can be achieved, for example, by application of nonlinear magnetic fields to the ion beam using multipole electromagnets placed in the path of the ion beam. Specific examples are disclosed in Yosuke Yuri, et al., "Uniformization of the transverse beam profile by means of nonlinear focusing method", Physical Review Special Topics—Accelerators and Beams, vol. 10, 104001 (2007). FIG. 6A shows an example of an odd-order nonlinear magnetic field, and the tail of the original beam can be folded simultaneously in both directions by application of this magnetic field. When an even-order nonlinear magnetic field is applied, the tail of the original beam is folded in only one direction, and then the even-order nonlinear magnetic field with the opposite sign is applied again, so that the tail of the original beam can also be folded in the other direction.

This folding is completely different from scattering or defocusing of the ion beam, or extraction of only a portion of the ion beam with relatively high intensity uniformity using a collimator or the like. In folding, the intensity of the tail of the ion beam is added to the intensity of the central portion of the beam. Therefore, the intensity of the entire beam can be generally maintained, although a small amount of intensity is lost. However, in scattering, defocusing and extraction of the beam, due to their principles, the intensity of the entire beam decreases significantly. In view of this fact, the production method of the present disclosure makes it possible to produce the porous polymer film 21 efficiently.

The original beam 51 is not particularly limited as long as it is composed of ions accelerated in a cyclotron and has a cross-sectional intensity distribution profile in which the intensity is maximum at the center of the beam and continuously decreases from the center toward the tail of the beam. Typically, the original beam 51 has a cross-sectional intensity distribution profile of the normal distribution with the maximum intensity at the beam center (a profile in which the intensity continuously decreases from the center of the beam according to the normal distribution). In the original beam, ions corresponding to a portion of the cross section may be removed (for example, ions corresponding to a portion in the vicinity of the periphery may be removed using a collimator or the like) as long as the effects of the present invention can be obtained. However, since the uniformity of the cross-sectional intensity distribution of an ion beam is increased by folding the tail, the original beam is preferably an original beam, any portion of which has not been removed.

The cross section of the original beam 51 has an approximately circular or elliptical shape. Ideally, the cross-sectional shape (the shape of the periphery 53) of the original beam composed of ions accelerated in a cyclotron is a circle or an ellipse, but the shape of the periphery 53 may be slightly distorted or deformed depending on the acceleration condition, for example, on the condition of the magnetic field applied to the ions. The term "approximately" means that this slight distortion or deformation is allowed. In other words, the approximately circular or elliptical shape means that the shape of the periphery 53 or the vicinity thereof may be a circle or an ellipse with allowable slight distortion or deformation. The approximately rectangular shape also means that the shape of the periphery 53 or the vicinity thereof may be a rectangle with allowable slight distortion or deformation.

Figure 7A:
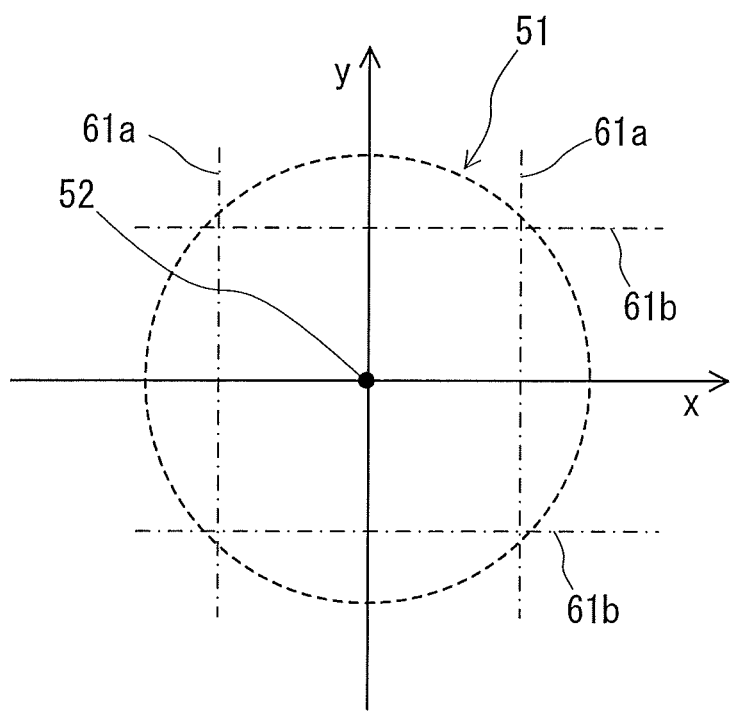
FIG. 7A is a schematic diagram showing an example of the folding of the original beam.
Figure 7B:
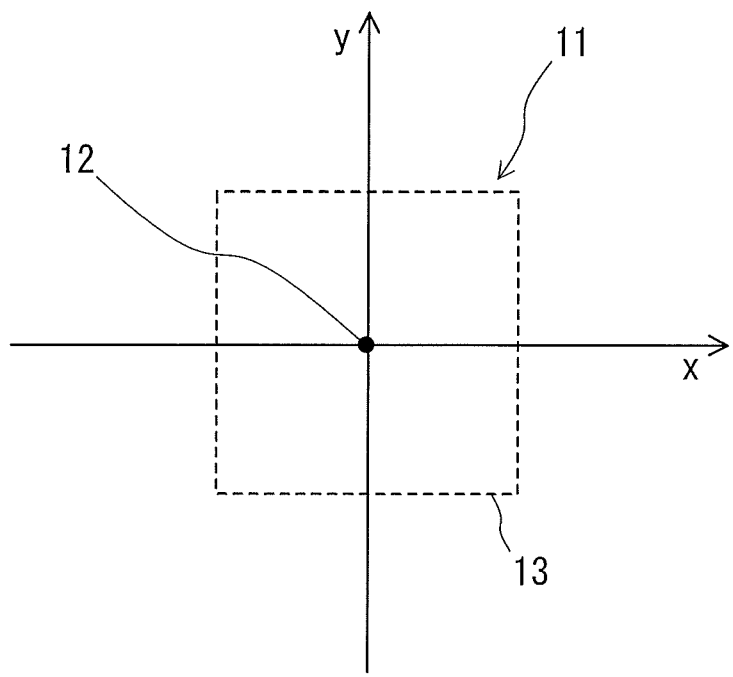
FIG. 7B is a schematic diagram showing a cross section of the ion beam having been subjected to the folding shown in FIG. 7A.

FIG. 7A and FIG. 7B show an example of the folding of the tail of the original beam 51. In the example shown in FIG. 7A, the tail of the original beam 51 is folded inwardly toward the center of the original beam 51 in the two directions perpendicular to each other in the cross section of the original beam 51 by nonlinear focusing. More specifically, two axes, an x axis and a y axis, perpendicular to each other and passing through the beam center 52 in the cross section of the original beam 51 are set, and the tail of the original beam 51 is folded inwardly toward the center of the beam in both the x axis direction and the y axis direction. This folding can be achieved by performing the foldings in these x and y axis directions respectively by nonlinear focusing. The foldings in these axis directions may be performed separately or simultaneously. The original beam 51 is transformed into the ion beam 11 having an approximately rectangular cross-sectional shape (the shape of the periphery 13) by these foldings, as shown in FIG. 7B. This transformation into the approximately rectangular ion beam 11 can be easily understood from a schematic view shown in FIG. 7A, in which the original beam 51 is folded along fold lines 61a perpendicular to the x axis and fold lines 61b perpendicular to the y axis in the cross section thereof. The folding of the original beam 51 is not limited to the example shown in FIG. 7A and FIG. 7B. The beam obtained by folding the tail of the original beam 51 inwardly toward the center thereof by nonlinear focusing in the two directions perpendicular to each other in the cross section is an example of the ion beam with which the polymer film 1 is irradiated.

The intensity distribution profile of the ion beam 11 with which the polymer film 1 is irradiated is not limited as long as it is a profile obtained by folding the tail of the original beam 51 inwardly toward the center thereof. The profile has, for example, an approximately trapezoidal shape, as shown in FIG. 6B, when the profile is taken along one axis in the cross section of the beam. In order to increase the uniformity of the collision density of the ions in the polymer film 1, it is preferable to perform the folding so that the ion intensity in a region corresponding to the upper side of the trapezoid is as uniform as possible. Since the ion beam 11 is obtained by folding the tail of the original beam 51, it is often the case that the maximum intensity at the beam center 12 is nearly unchanged from the maximum intensity at the beam center 52 of the original beam 51, that is, the maximum intensity of the ion beam 11 can be almost equal to that of the original beam 51. This means that not only the maximum intensity of the original beam 51 but also the maximum intensity of the folded ion beam 11 can be controlled with high accuracy by controlling the cyclotron. Also in view of this, the production method of the present disclosure makes it possible to produce porous polymer films more efficiently.

Preferably, the cross-sectional shape of the ion beam 11 with which the polymer film 1 is irradiated is approximately rectangular, as shown in FIG. 7B. In this case, efficient and uniform beam irradiation to the strip-shaped polymer film 1 can be performed. The rectangle includes a square. However, since the beam cannot necessarily be subjected to linear foldings shown in FIG. 7A, the resulting cross-sectional shape of the ion beam 11 may be slightly distorted into a "barrel-shape" or a "pincushion-shape" in some cases. The "approximately rectangular shape" includes these distorted cross-sectional shapes.

The cross-sectional shape of the ion beam 11 and the degree of uniformity thereof can be evaluated by, for example, irradiating a radiochromic dosimeter (for example, a Gafchromic film dosimeter manufactured by ISP Technologies, Inc.) with the ion beam 11 and analyzing the ion beam absorbance of the irradiated surface using a scanner of the dosimeter. Alternatively, the cross-sectional shape of the ion beam 11 and the degree of uniformity thereof can be determined in the form of the distribution of ion beam currents by arranging two or more Faraday cups in the cross section of the beam (for example, by arranging them in the width direction of the beam) and reading the current value of each cup.

Figure 8:
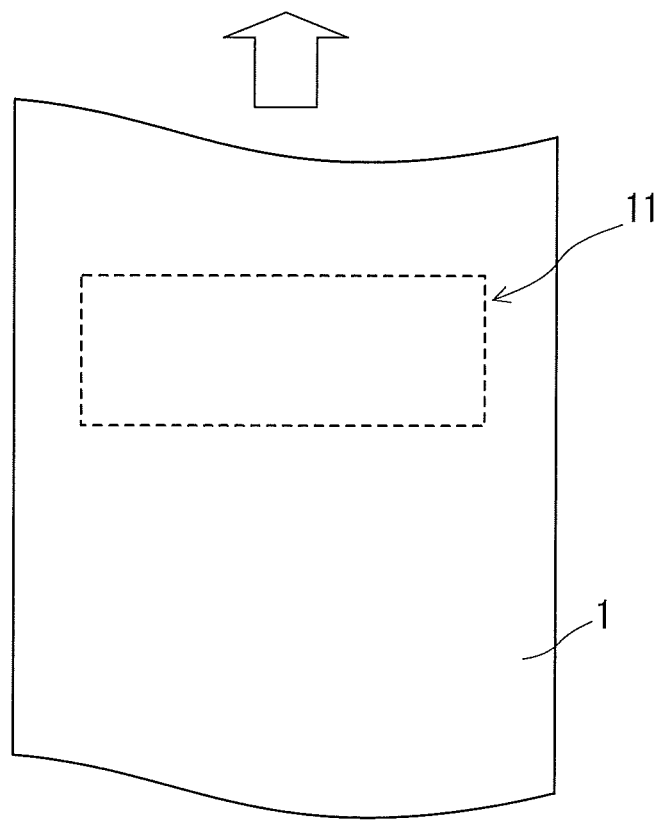
FIG. 8 is a schematic diagram showing an example of irradiation of a strip-shaped polymer film with an ion beam having an approximately rectangular cross section.

As shown in FIG. 8, in the irradiation step (I), the polymer film 1 may be irradiated with the ion beam 11 in such a manner that the direction of the long side of the approximately rectangular shape coincides with the width direction of the strip-shaped polymer film 1 passing transversely across the ion beam 11. In this case, the movement of the polymer film 1 (in the example shown in FIG. 8, the movement of the polymer film 1 in the direction indicated by an arrow) makes the beam irradiation more efficient and more uniform and thus makes it possible to produce a porous polymer film having high uniformity of porosity more efficiently. In this case, as shown in FIG. 8, it is possible to irradiate the polymer film 1 with the ion beam 11 being applied in a fixed direction.

It is preferable that the direction in which the ion beam 11 is applied be fixed as shown in FIG. 8 to achieve application of a highly uniform beam, more specifically application of a beam having high uniformity of collision density of ions. However, the ion beam 11 may be applied to the polymer film 1 in such a manner that the film 1 is scanned by the beam 11.

Any known method can be applied to the irradiation of the polymer film with the ion beam composed of ions accelerated in the cyclotron, except for the folding of the original beam by nonlinear focusing. For example, the ion source of the ions applied to the polymer film is not particularly limited. The method for generating ions in the ion source, the specific configuration of the cyclotron, and the method for accelerating, in the cyclotron, the ions generated in the ion source are not particularly limited. The folded ion beam 11 may be subjected to any processing such as adjustment of the intensity by an attenuator or removal of a portion of the beam by a collimator as long as the effects of the present invention can be obtained.

The type of the ions 2 to be applied to the polymer film 1 and caused to collide with the polymer film is not limited. The ions are preferably those having a larger mass number than neon, specifically at least one selected from argon ions, krypton ions, and xenon ions, because these ions are less chemically reactive with the polymer constituting the polymer film 1. The shape of the tracks formed in the polymer film 1 varies with the type and energy of the ions 2 applied to the polymer film 1. In the case of argon ions, krypton ions, and xenon ions, if they have the same energy, ions or an atom having a lower atomic number can form longer tracks in the polymer film 1. The change in the shape of the tracks associated with the change in the ionic species and the change in the energy of the ions corresponds to the change in the shape of the pores formed in the etching step (II). Therefore, the ionic species and its energy can be selected according to the shape of the pores required for the porous polymer film 21.

In the case where the ions 2 are argon ions, their energy is typically 100 to 1000 MeV. In the case where a polyethylene terephthalate film with a thickness of about 10 to 200 µm is used as the polymer film to form through holes therein, the energy of the ions is preferably 100 to 600 MeV. The energy of the ions 2 to be applied to the polymer film 1 can be adjusted according to the ionic species and the polymeric species constituting the polymer film.

The method for moving the strip-shaped polymer film 1 transversely across the ion beam 11 is not particularly limited as long as the irradiation step (I) can be carried out. In order to prevent attenuation of the energy of ions, the path of the ion beam (beam line) is maintained in a high vacuum atmosphere, for example, at a pressure of about $10^{-5}$ to $10^{-3}$ Pa. It is possible to minimize the attenuation of the energy of ions before they collide with the polymer film by placing the polymer film 1 in a chamber whose atmosphere is maintained at a vacuum as high as that in the beam line and irradiating the moving polymer film 1 with an ion beam in that chamber. In order to achieve such irradiation, the following processes, for example, can be performed: A supply roll on which the strip-shaped polymer film is wound and a take-up roll on which the ion-beam-irradiated polymer film is to be wound are placed in a chamber; the polymer film is fed from the supply roll and the fed polymer film is moved transversely to the ion beam so that the ions collide with the film when the film passes transversely across the ion beam; and then the polymer film that has collided with the ions is wound on the take-up roll (i.e., a roll-to-roll method). In producing a polymer film, the produced film is usually wound on a roll. Therefore, this method increases the productivity of porous polymer films. The feeding of the polymer film from the supply roll may be performed continuously or intermittently. The application of the ion beam onto the polymer film also may be performed continuously or intermittently. The feeding and application can be adjusted depending on the ion collision density required. In order to adjust the feeding and application, the density of ions that have collided with the polymer film and/or the density of ions that have passed through the polymer film may be detected to feedback-control the feeding of the polymer film and/or the application of the ion beam based on the detected value.

The polymer film placed in a low vacuum atmosphere (for example, with a pressure of 100 Pa or more) or in an atmosphere with an atmospheric pressure may be irradiated with ions that have passed through a beam line maintained at a high vacuum atmosphere from the cyclotron to the vicinity of the polymer film. In this case, it is possible not only to minimize the attenuation of the energy of ions in the beam line but also to obtain the following effects: (1) the time required to replace the polymer film can be reduced; and (2) the influence of outgassing from the supply roll on the vacuum in the atmosphere can be minimized and thus a stable irradiation atmosphere can be obtained (an atmosphere with a pressure of 100 Pa or more is stable and easy to maintain when the supply roll is used). In this case, a pressure barrier sheet can be disposed at the boundary between the high vacuum atmosphere and the low vacuum atmosphere or the atmospheric pressure atmosphere. The pressure barrier sheet is a sheet that is permeable to the ions enough to produce a porous polymer film, that is, enough to form openings and/or through holes by chemical etching in the etching step (II). The pressure barrier sheet is, for example, a metal sheet. The pressure barrier sheet is preferably a titanium sheet or an aluminum sheet.

The polymer constituting the polymer film is not particularly limited. Examples of the polymer include polyesters such as polyethylene terephthalate and polyethylene naphthalate, polycarbonates, polyimides, and polyvinylidene fluorides.

The thickness of the polymer film is, for example, 10 to 200 µm.

In the case where the atmosphere in which the polymer film is placed (the atmosphere in which the polymer film is irradiated with the ion beam) is air and its pressure is an atmospheric pressure, the polymer film need not be placed in an enclosed space (for example, in a chamber) and may be placed in an open space. The supply roll and the take-up roll also may be placed in an open space. Also in this case, the polymer film may be placed in an enclosed space, of course.

In the case where the atmosphere in which the polymer film is placed is not air or the pressure of the atmosphere is lower than the atmospheric pressure, it is preferable to place the polymer film in an enclosed space, for example, in a chamber. It is also preferable to place the supply roll and the take-up roll in an enclosed space.

In the irradiation step (I), the polymer film 1 is irradiated with the ion beam, for example, from a direction perpendicular to the principal surface of the polymer film 1. In the example shown in FIG. 1, the film 1 is irradiated with the ion beam in this manner. In this case, the porous polymer film 21 having the pores extending in the direction perpendicular to the principal surface of the film is obtained in the etching step (II). In the irradiation step (I), the polymer film 1 may be irradiated with the ion beam from a direction oblique to the principal surface of the polymer film 1. In this case, the porous polymer film 21 having the pores extending in the direction oblique to the principal surface of the film 1 is obtained in the etching step (II). The direction in which the polymer film 1 is irradiated with the ion beam can be controlled by a known means.

In the irradiation step (I), the polymer film 1 is irradiated with the ion beam, for example, so that the tracks of the ions 2 are parallel to each other. In the example shown in FIG. 1, the film is irradiated with the ion beam in this manner. In this case, the porous polymer film 21 having the pores extending in parallel to each other is obtained in the etching step (II). In the irradiation step (I), the polymer film 1 may be irradiated with the ion beam so that the tracks of the ions 2 are non-parallel to each other (for example, the directions of the tracks are randomly distributed). The tracks of the ions 2 applied can be controlled by a known means.

A device for performing the irradiation step (I) includes, for example, an ion gas source, an ion source device for ionizing a gas, an electromagnet for deflecting a beam of ions, a cyclotron, a scatterer, a beam duct including a beam line of the ions accelerated in the cyclotron, a multipole electromagnet for focusing and shaping the ion beam, a vacuum pump for maintaining the path of the ion beam at a predetermined vacuum, a chamber in which a polymer film is to be placed, a moving device of the polymer film, and others.

[Etching Step (II)]

In the etching step (II), the polymer film that has collided with the ions in the irradiation step (I) is chemically etched so as to form the openings and/or the through holes corresponding to the tracks left by the colliding ions in the polymer film and obtain the porous polymer film.

As the etching agent for the chemical etching, for example, acid or alkali can be used. The chemical etching can be performed according to a known method.

The pore diameter of the pores having the openings or the pores serving as the through holes varies depending on the ionic species used in the irradiation step (I) and its energy. The pore diameter is, for example, 0.01 to 10 μm. These pores normally extend linearly.

The direction in which the pores extend can be a direction perpendicular to the principal surface of the porous polymer film.

The density of the pores in the obtained porous polymer film can be controlled by the ionic species used in the irradiation step (I), and the energy and the collision density (irradiation density) of that ionic species.

The production method of the present disclosure may include an optional step, for example, a step of accelerating etching, in addition to the steps (I) and (II) as long as the effects of the present invention can be obtained.

Porous polymer films produced by the production method of the present disclosure can be used in the same applications as those of conventional porous polymer films. The applications are, for example, waterproof air-permeable sheets and optical sheets.

The present invention is applicable to other embodiments as long as they do not depart from the spirit or essential characteristics thereof. The embodiments disclosed in this description are to be considered in all respects as illustrative and not limiting. The scope of the invention is indicated by the appended claims rather than by the foregoing description, and all changes which come within the meaning and range of equivalency of the claims are intended to be embraced therein.

INDUSTRIAL APPLICABILITY

Porous polymer films produced by the production method of the present invention can be used in the same applications as those of conventional porous polymer films.

The invention claimed is:

1. A method for producing a porous polymer film, comprising:
    irradiating a polymer film strip with an ion beam so as to form a polymer film strip that has been subject to collision with ions in the beam; and
    chemically etching the formed polymer film strip so as to form openings and/or through holes corresponding to tracks left by the colliding ions in the polymer film, wherein:
        the ion beam with which the polymer film strip is irradiated is obtained by folding a tail of an original beam inwardly toward a center of the original beam by nonlinear focusing, the original beam being composed of ions accelerated in a cyclotron and having a cross-sectional intensity distribution profile in which an intensity is maximum at the center of the original beam and continuously decreases from the center toward the tail of the original beam, and the profile being an intensity distribution profile in a cross section perpendicular to a direction of the original beam,
        the cross section of the ion beam is approximately rectangular,
        the direction in which the ion beam is applied to the polymer film strip is fixed during irradiation of the polymer film strip,
        the ion beam is oriented such that a long side of the approximately rectangular cross section of the ion beam coincides with a width of the polymer film strip, and
        in the irradiation, the polymer film strip is moved transversely to the ion beam so as to irradiate the polymer film strip with the ion beam.

2. The method for producing a porous polymer film according to claim 1, wherein the original beam has the profile of a normal intensity distribution in which the intensity is maximum at the center of the original beam.

3. The method for producing a porous polymer film according to claim 1, wherein the cross section of the original beam is approximately circular or elliptical.

4. The method for producing a porous polymer film according to claim 1, wherein the ion beam is obtained by folding the tail of the original beam inwardly toward the center of the original beam in two directions perpendicular to each other in the cross section of the original beam by nonlinear focusing.

5. The method for producing a porous polymer film according to claim 1, wherein the ions have a larger mass number than neon.

\* \* \* \* \*